United States Patent [19]

Schwarz

[11] 4,199,247
[45] Apr. 22, 1980

[54] PHOTOGRAPHIC DIAPHRAGM WITH TWO INDEPENDENT SETS OF LEAVES

[75] Inventor: Gerhard Schwarz, München, Fed. Rep. of Germany

[73] Assignee: Carl Zeiss Stiftung, Oberkochen, Fed. Rep. of Germany

[21] Appl. No.: 914,207

[22] Filed: Jun. 12, 1978

[30] Foreign Application Priority Data

Jun. 10, 1977 [DE] Fed. Rep. of Germany ....... 2726144

[51] Int. Cl.² .................................................. G03B 9/06
[52] U.S. Cl. ...................................... 354/274; 354/272
[58] Field of Search ................................. 354/274, 272

[56] References Cited

U.S. PATENT DOCUMENTS

| | | | |
|---|---|---|---|
| 2,944,477 | 7/1960 | Tesch | 354/274 |
| 2,949,076 | 8/1960 | Finkl | 354/274 |

FOREIGN PATENT DOCUMENTS

| | | | |
|---|---|---|---|
| 1026991 | 3/1958 | Fed. Rep. of Germany | 354/274 |
| 1115474 | 10/1961 | Fed. Rep. of Germany | 354/274 |
| 869872 | 6/1961 | United Kingdom | 354/274 |

Primary Examiner—L. T. Hix
Assistant Examiner—Shelley Wade
Attorney, Agent, or Firm—Stonebraker, Shepard & Stephens

[57] ABSTRACT

A photographic diaphragm of the iris type, having two sets or series of diaphragm leaves instead of the usual single set. Each leaf is relatively narrow in a direction radially with respect to the optical axis, thereby reducing the radial dimensions of the annual space necessary to receive the leaves when the diaphragm is fully open. During a closing down movement to a smaller aperture, both sets or series of diaphragm leaves swing inwardly simultaneously during the first part of a closing movement; then one set of leaves remains stationary while the other set continues to swing inwardly to close the aperture down to as small a size as desired. The two series of leaves are in separate planes slightly spaced from each other in the direction of the optical axis. The diaphragm is preferably of the spring back type, which will spring back automatically to a predetermined aperture after it has been opened wide for focusing purposes.

3 Claims, 2 Drawing Figures

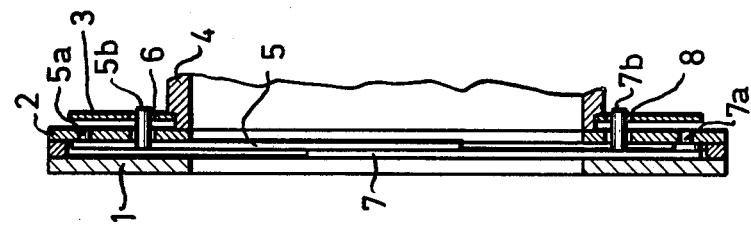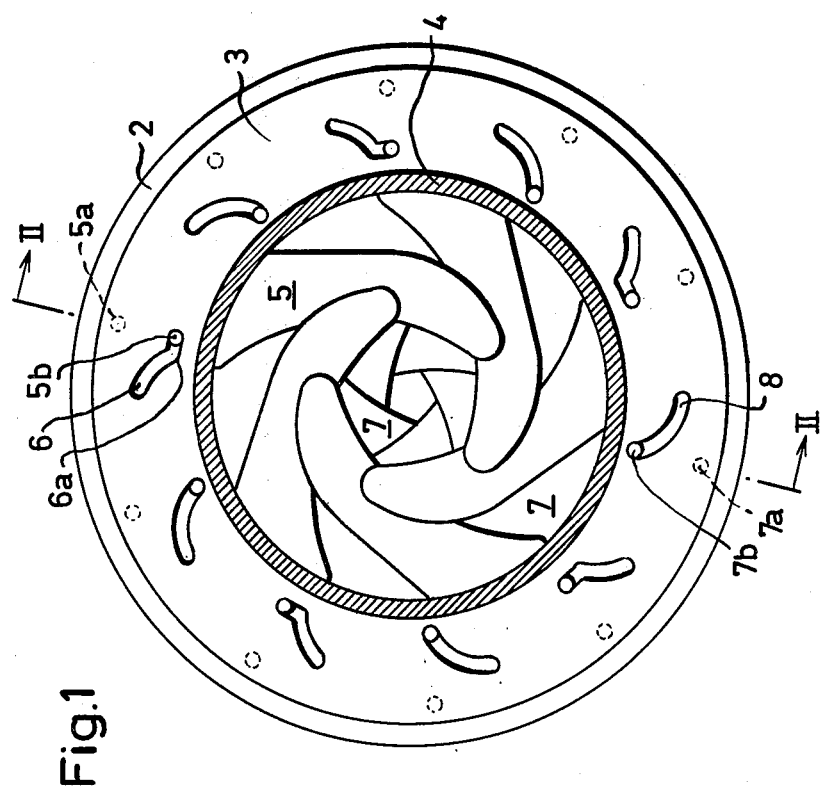

PHOTOGRAPHIC DIAPHRAGM WITH TWO INDEPENDENT SETS OF LEAVES

BACKGROUND OF THE INVENTION

Diaphragms are used in various locations in the photographic art, such as in photographic enlargers, as well as in cameras. In the familiar single lens reflex camera, often referred to as an SLR camera, the diaphragm is preferably of the spring back type, opened wide to maximum aperture to admit maximum light during the focusing operation, and then closing down by spring action to a smaller aperture which has either been preset by the user of the camera or been automatically determined by the camera mechanism in response to a light measurement, this stopping down of the diaphragm occurring just before the exposure is to be made.

The space available in the housing or casing for the diaphragm is limited. According to the present invention, the external dimensions of the housing can be reduced in a radial direction (radial with respect to the optical axis) because two sets or series of diaphragm opening leaves are used instead of one, thereby enabling the leaves to be narrower in a radial direction with respect to the optical axis, so that they do not require so much radial space in the housing, when the leaves are in the fully open position.

An object of the present invention is to provide a spring back diaphragm for use especially but not exclusively in photographic cameras, and particularly in SLR cameras, in which the diaphragm, when fully open, has a larger free passage (that is, larger dimensional aperture) in proportion to the area of the annular space of the housing or mount which contains the diaphragm leaves when in their fully open position, than diaphragms of the prior art, and has a more favorable ratio of the area of the annular space of the housing to the size of the maximum aperture, than in diaphragms of the prior art.

For example, in one known diaphragm, when fully open to maximum aperture, there is a free passage having a diameter of 24 millimeters, and the diaphragm leaves lie in an annular space having an outside diameter of 45.2 mm when the diaphragm is fully open. In this known diaphragm, the area of the annular space required for housing the leaves in open position is more than 2.5 times the area of the maximum aperture, or a ratio of housing area to aperture area of approximately 2.5 to 1. As contrasted with this, a diaphragm according to the present invention can be made with a ratio of only about 1.5 to 1, as shown below.

This purpose is attained, in accordance with the invention, by providing the diaphragm leaves or blades in two groups or series, arranged in two different planes slightly spaced from each other in the direction of the optical axis. Each group or set of leaves arranged in the respective planes can be assigned a specific path upon the closing motion of the diaphragm, or the same path may be provided for both groups of leaves. The leaves can be mounted in such manner that upon closing the diaphragm, the leaves of both groups move in the same direction of rotation, or in opposite directions of rotation, as desired.

One advantageous embodiment of the invention comprises ten diaphragm leaves provided for the diaphragm, five of which are in one group, arranged in one plane, and the other five of which are in a second group, arranged in another plane spaced very slightly in an axial direction (axially of the optical axis) from those of the first group. The two groups of leaves move together, increasingly overlapping each other, until a predetermined diaphragm aperture is reached, whereupon the leaves of one group remain substantially stationary and only the leaves of the other group continue swinging further in a closing direction to close the diaphragm down to a still smaller aperture. The point at which the inward swinging movment of one group ceases can be chosen as desired, but is preferably the point at which an average or commonly used size of aperture is produced.

An advantage of the invention is the saving in outside dimensions of the mount or housing which holds the diaphragm leaves when they are retracted to maximum aperture position, as already mentioned above. By using ten leaves instead of the customary five leaves, each leaf can be made relatively narrow (in a direction radially with respect to the optical axis) and the first set of leaves, stopping their inward swinging movement before the minimum size aperture is reached, will serve to block light around the periphery of the light opening even when the leaves of the second group continue to move further inward to form the smallest aperture, which might bring the outer edges of these leaves inwardly beyond the periphery of the opening and might leave gaps at the periphery which, however, are effectively obstructed by the leaves of the other set. With this arrangement, a diaphragm can be constructed with, for example, a free passage through the fully opened diaphragm having a diameter of 34.5 mm., with an outside diameter of the annular space of the housing or mount being only 55.0 mm. The ratio of annular housing area to maximum aperture is only 1.5 to 1, which is quite favorable as compared with the previously mentioned prior art ratio of 2.5 to 1. Moreover, if it were attempted to make a diaphragm with a maximum aperture diameter of 34.5 mm. with only five leaves arranged in the conventional manner, the leaves would have to be much wider in a direction radially with respect to the optical axis, in order to avoid gaps or open spaces at the outer edge of the light opening when the diaphragm is stopped down to a small aperture, and this would result in the annular space for receiving the diaphragm leaves (when fully open) having an outside diameter of 65 mm, as compared with the outside diameter of only 55 mm with the present construction.

BRIEF DESCRIPTION OF THE DRAWINGS

FIG. 1 is a view of the pertinent parts of a diaphragm according to a preferred embodiment of the invention, viewed in the direction of the optical axis, with parts in plan and parts in cross section; and FIG. 2 is a diametrical section through the same, taken substantially on the line II—II of FIG. 1.

DESCRIPTION OF THE PREFERRED EMBODIMENT

Referring now to the drawings, only the parts necessary to an understanding of the invention are shown, and these are illustrated somewhat schematically or diagrammatically, but sufficiently so that the invention will be readily understood by those skilled in the art of the construction of iris diaphragms for photographic purposes.

The construction includes a housing or mount having fixed parts (that is, fixed relative to each other, although they may be movable relative to the camera on which they are mounted) including a front wall 1 and a rear wall 2 both of annular form, and a cylindrical tube 4 fixed to the wall 2 and extending rearwardly therefrom, and suitably mounted on the camera or on the shutter or the lens mount or any other suitable part of the mechanism with which the diaphragm is to be used. Between the front wall 1 and the rear wall 2 is the annular space in which are located the two groups or sets of iris diaphragm leaves or blades respectively indicated at 5 and 7. The leaves of each group are arranged in overlapping relation to each other in the normal way as common in iris diaphragms, but the blades of one group are slightly spaced axially (that is, axially with respect to the optical axis passing through the center of the opening of the mount) with respect to each other. The two groups or sets are very close to each other, but preferably do not actually rub against each other, or if they are in contact, they rub only very lightly against each other. The leaves of the first group are indicated at 5, and those of the second group are indicated at 7.

The leaves 5 and 7 are respectively pivoted at 5a and 7a. They have guide pins 5b and 7b, respectively, which move in cam slots 6 and 8, respectively, contained in the diaphragm control ring or adjusting ring 3.

In the embodiment illustrated in the drawings, the number of blades used is twice as great as in a conventional iris diaphragm, where five leaves or blades are customarily used. As a result of this, the size of the individual leaf is reduced as above explained, so that the size in a radial direction of the annular space between the front wall 1 and the rear wall 2 of the diaphragm housing or mount is less than in an iris diaphragm of conventional construction and of comparable aperture diameter. The pivots 5a and 7a of the diaphragm leaves are seated in pivot openings or bearings in the wall member 2, and the control pins or guide pins 5b and 7b of the respective diaphragm leaves extend through slots in the wall 2 so as to enter the control cams 6 and 8, respectively, in the control ring 3 which turns on a bearing shoulder on the tube 4 and which is located to the rear of the wall 2, that is, on the opposite side of this wall from the diaphragm leaves.

The two sets or groups of diaphragm leaves can be arranged to swing either in the same direction or in opposite directions. In the construction illustrated in FIG. 1, the cam slots 6 and 8 are arranged to swing the leaves in the same direction, that is, all of the leaves have their lengths extending in a generally or roughly clockwise direction from their respective pivots 5a and 7a on which they are mounted. However, it is entirely possible to arrange the respective leaves to extend in opposite directions, with those of one group or set extending clockwise from their pivots and those of the other group or set extending counterclockwise from their pivots, merely rearranging the shape and direction of the respective control slots 6 and 8 in the control ring 3.

In the preferred embodiment as here illustrated, the two groups of leaves move over approximately the same path to approximately the same extent during the first part of the closing motion from maximum aperture down to an intermediate aperture which is reached when the control pins 5b of the leaves 5 reach the angular inflection or junction 6a of the respective control slot 6. After this point is reached, further rotation of the control ring 3 will not cause further inward movement of the leaves 5, because the further part of each slot 6 is concentric with the optical axis. But the other control slot 8 which control the other leaves 7 continue their camming action and continue to move the leaves 7 further inwardly to reduce the size of the diaphragm aperture, after the leaves 5 have completed their inward swinging movement and move no further inwardly.

Attention is called to U.S. Pat. No. 2,949,076, granted Aug. 16, 1960 to Finkl, which discloses an iris diaphragm having certain features in common with the present construction. However, the construction disclosed in that patent differs in various respects from the present construction, and is less satisfactory.

What is claimed is:

1. A photographic diaphragm comprising two sets of leaves, each set including a series of leaves, pivoted to swing from outer positions providing maximum aperture for passage of light along an optical axis centrally through the diaphragm inwardly toward inner positions providing reduced aperture, the leaves of one set lying approximately in a first plane, the leaves of the other set lying approximately in a second plane slightly spaced from the first plane in a direction along said optical axis, the leaves of each set being mounted to swing on individual pivots separate from the pivots of the leaves of the other set, a rotatable control ring, cam slots in said ring, there being an individual cam slot for each separate leaf of each set, each diaphragm leaf of both sets having a control pin engaged in its own individual one of said cam slots, said cam slots being shaped to cause swinging movement of the respective diaphragm leaves of both sets during at least part of a rotary movement of said control ring through its complete range of movement.

2. The invention defined in claim 1, wherein said cam slots in said control ring are so shaped that during rotary movement of said control ring from maximum aperture position to minimum aperture position said slots are effective to swing both sets of leaves inwardly simultaneously for a time, and thereafter to hold the leaves of one set substantially stationary while continuing to swing the leaves of the other set inwardly to reduce the aperture further.

3. The invention defined in claim 1, wherein said cam slots are so shaped that during rotary movement of said control ring from maximum diaphragm aperture position to minimum diaphragm aperture position, the diaphragm leaves of both sets will be simultaneously swung inwardly during a part of the rotary movement of the control ring and thereafter the leaves of one set will remain substantially stationary and the leaves of the other set will continue to swing inwardly during further rotary movement of the control ring.

* * * * *